Figure 1:
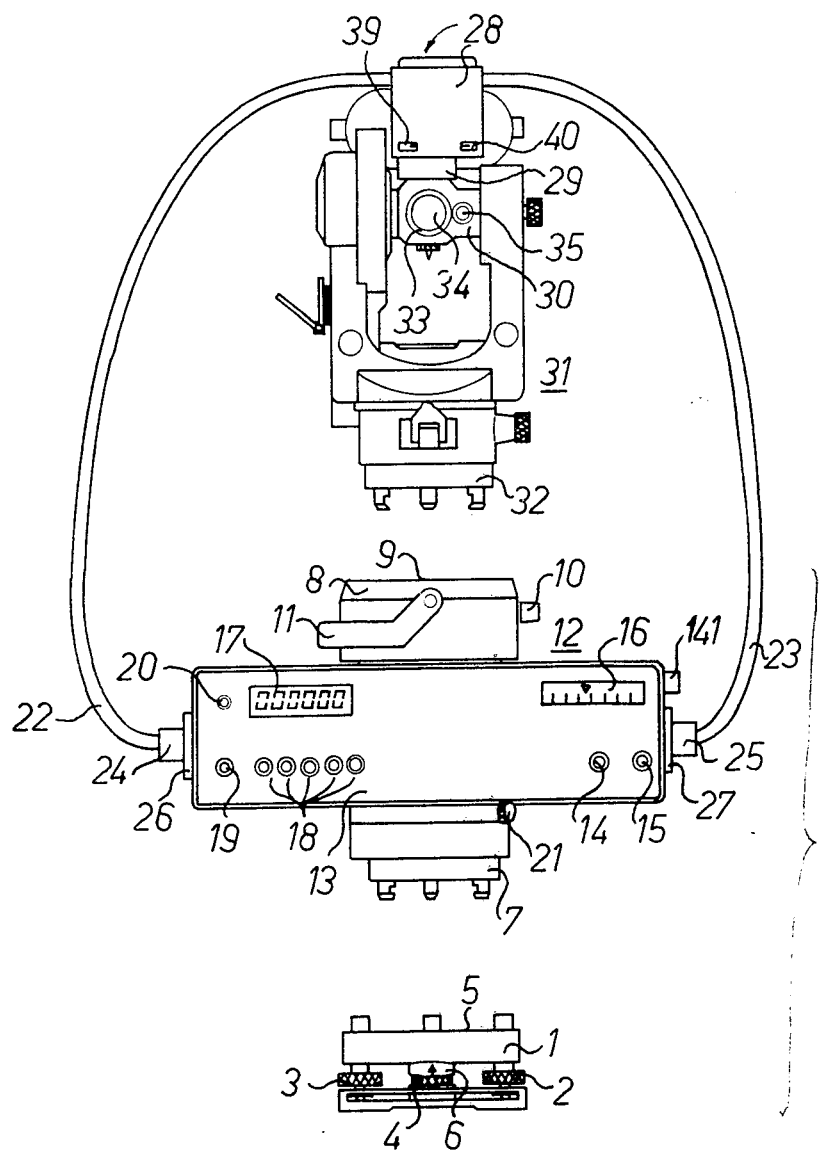

United States Patent [19]
Strasser

[11] 3,895,871
[45] July 22, 1975

[54] ELECTRONIC TACHYMETER

[75] Inventor: Georg Strasser, Rebstein, Switzerland

[73] Assignee: Wild Heerbrugg Aktiengesellschaft, Heerbrugg, Switzerland

[22] Filed: Oct. 25, 1972

[21] Appl. No.: 300,596

[30] Foreign Application Priority Data
July 21, 1972  Switzerland...................... 10940/72

[52] U.S. Cl. .......................... 356/4; 356/5; 356/141; 356/152; 33/1 T; 33/284
[51] Int. Cl. ............................................. G01c 3/08
[58] Field of Search ............. 33/1 T, 227, 281, 284; 356/4, 5, 152

[56] References Cited
UNITED STATES PATENTS

| | | | |
|---|---|---|---|
| 2,485,558 | 10/1949 | Braunlich | 33/1 T |
| 3,610,755 | 10/1971 | Wieberger et al. | 356/4 |
| 3,677,646 | 7/1972 | Granqvist | 356/5 |
| 3,778,160 | 12/1973 | Wolcott | 356/5 |

OTHER PUBLICATIONS
"Laser Rangefinders," Control Data Corp. Brochure, 356–5.

*Primary Examiner*—Maynard R. Wilbur
*Assistant Examiner*—S. C. Buczinski
*Attorney, Agent, or Firm*—Flynn & Frishauf

[57] ABSTRACT

To permit easy, accurate movement of the transit element of an electronic tacheometer, about its support axis, without interference by connecting cables or heavy electronic component attachments, the electronic components of the tacheometer are placed in a housing which is rotatable about the main support post of the transit unit, connected by cables to the transit unit, so that the electronic components and the transit unit can rotate together, without, however, introducing a drag on the transit, or heavy weight on the telescope or transducer structure.

14 Claims, 2 Drawing Figures

ELECTRONIC TACHYMETER

The present invention relates to an electronic tacheometer and more particularly to a type of survey instrument in which a transit is used, together with electronic transducer elements, which provide electrical signals which have to be analyzed and on which data processing operations have to be carried out to obtain desired measurement data.

Various type of electronic tacheometer are known; briefly, they can be subdivided into two groups. One group relates to apparatus in which all components are in one unit, which can rotate about the main support post of the instrument. Such apparatus does not require any separate supply cables to the structural elements and units which can rotate about the axis of the support post. Such apparatus is heavy, however, and thus difficult to handle. The difficult handling is particularly annoying when the apparatus is to be first positioned, since it must be accurately centered and placed with respect to a tripod having a usually horizontal table, or the like, or in a centered support unit. Such apparatus are suitable for special applications, and are very expensive, since the bearings and the adjustment and setting mechanisms are loaded by the weight of all components and yet must operate together with the same precision as that customary with the relatively light-weight optical transit structures.

The other group of known electronic tacheometer are apparatus in which the various separate electronic components are connected by cables extending from the portion of the entire tacheometer which is rotatable about the transit axis, to a separate apparatus which is remotely located. The apparatus which includes a housing for the electronic components is placed adjacent the transit itself. Only those components which are absolutely necessary for cooperation with the transit are located on the transit element, so that a relatively light-weight and easily used apparatus is provided. This type of apparatus has the additional advantage that it can be arranged in modular form so that the additional components utilized in electronic distance measuring and surveying can be separately connected to the transit or measuring head itself, and so that the transit can be used, if necessary, without the electronics as an ordinary surveying instrument. A further advantage is that such apparatus can readily be kept up to date and adapted to all technological advances, since portions of the tacheometer, for example the transit with its expensive optics can be continued to be used, while electronic components, which are improved, are replaced with the latest models. This type of apparatus has, however, a substantial disadvantage which greatly interferes with its use. The cable connections between the electronic unit or assembly to the swingable or rotatable measuring head of the transit interferes with operation of the transit as well as with ready accessibility by operating personnel. The transit may have to be rotated over wide angles and this interferes with access to the various operating elements of the transit measuring head, as well as with actual operation thereof. Further, the cables provide a drag on the movement of the transit head, which is uneven, and which tends to move the transit head out of balance. The separation of the transit head and the electronics usually requires more operating personnel, or more time because the different locations of the transit, and of the electronic elements, which usually contain the read-out units, require checking and re-checking of positions.

It is an object of the present invention to provide a tacheometer, or a combined optical and electronic type of measuring and surveying instrument which combines the advantages of both groups, to the extent possible, without any of the disadvantages thereof.

SUBJECT MATTER OF THE PRESENT INVENTION

Briefly, the electronic portion of the tacheometer is included in a housing which surrounds the support post, or support element for the optical measuring head, or optical transit head of the apparatus, and is so mounted on the support that it can rotate or swing together with the measuring head, thereby eliminating cable drag, while also eliminating the problem of moving heavy equipment together with the measuring head, directly, and permitting standard, light-weight and accurate mounting of the measuring head to accurately determine its angular position. Rotation of the electronic components, about the vertical axis, about which the measuring head is also rotatable, further permits utilizing a portion of the electronic part as the support element, that is, incorporating the electronic element in the support post, or placing it around the support post, as a separate unit, with interconnection arrangements which permit exactly centered and aligned location of the transit head, the support post, and that portion of the equipment which is interposed between the base support and the measuring head, and includes or supports the electronic equipment. Preferably, the electronic equipment is separable as a removable unit.

Figure 2:
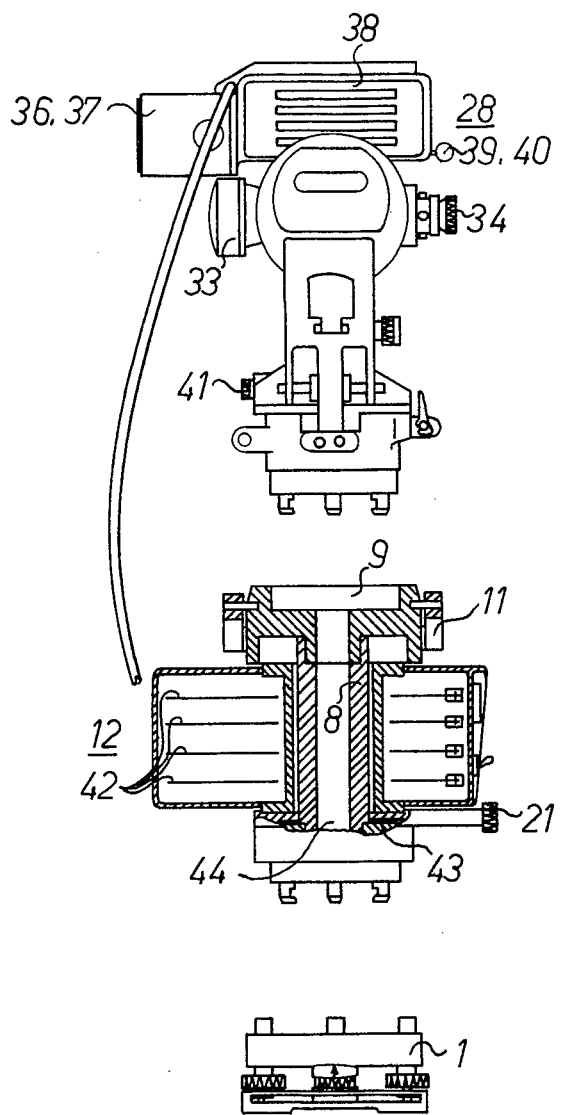

The invention will be described by way of example with reference to the accompanying drawings, wherein:

FIG. 1 is a schematic view of an electronic tacheometer including, as separable units which can be assembled together, a measuring head, including a transit, an electronic component, and a base support; and FIG. 2 is a side view, with the electronic support in section, of the tacheometer of FIG. 1, rotated by 90 degrees with respect to FIG. 1.

A base support unit 1, which can be accurately aligned and levelled on three levelling screws 2, 3, 4, has at its upper side a centering flange 5 to which a support post, or other connecting elements can be attached, and if so attached, will be accurately aligned and centered with respect to the base 1. An operating button 6 forms a lock for a centering socket 7 of a further elongated support element or shaft 8 on which an electronic console unit 12, to be described in detail below, is rotatably located in axially predetermined, or adjustable position. The upper end of shaft or post 8 is formed with a centering head 9, which may be similar to the centering head 5, to accept the transit unit 31 itself, in accurately centered alignment. A holding or locking button 10 locks the centering arrangement — which may be of any type well known in the art — of shaft 8 and measuring head 31 together.

The upper end of post 8 has a handle 11 attached thereto which can be flipped upwardly to carry post 8, and with it the electronic unit 12 for field assembly. The electronic unit 12 is rotatable about a vertical axis concentric with the central axis of post 8. It has a front plate 13 on which operating elements and components, as well as indicators and meters for an electro-optical distance measuring device are located. Specifically, the operating elements include switches 14, 15, 20, and control buttons 18 and 19. Switch 14 is the on-off switch for the electronic unit 12; switch 15 is a start button to initiate distance measuring by the measuring head 28 located on top of transit unit 31. The way in which distance is measured may be in accordance with any known method and is subject subjected matter of the present invention. The electronic unit 12 is interconnected with the distance measuring head 28 by means of cables 22, 23, which supply, for example over separate cables, power and control signals from the electronic unit 12 to the distance measuring head 28, as required, and additionally conduct the signals from measuring head 28 to the electronic unit 12. These cables can be lightweight. A galvanometer 16 is provided to indicate received signals from the distance measuring head 28. Azimuth and elevation, that is, vertical angle, can additionally be determined from the reading of the transit, and read on scales, arranged on the transit 31 in known manner, to be read during or after distance measuring by the transit. The so read values can be introduced into the electronic unit 12 by means of control buttons 18. The panel 13 further includes a digital indicator 17, and a control button 19 which initiates computation by a computer element included within the unit 12. The elevation and azimuth which are read from the transit, as well as the electronic signals measured by measuring head 28 are applied to a computer within the electronic portion 12, and so combined therein that horizontal distance and difference in height, or level can be computed from the actually measured inclined angles and distances. Operating button 19 starts the computation. Switch 20 is a three-position selector switch; in a first position of switch 20, indicator 17 provides a check read-out of the data read into the apparatus by operation of buttons 18; in a second position, indicator 17 provides a digital read-out of computed horizontal distances; and in a third position, digital indicator 17 provides a direct read-out of level or elevation difference between the instrument position, and the position of the reflector used in electronic surveying. The operator can, therefore, by suitable operation of switch 20 obtain direct read-out of measured, or computed values, as desired, by selective positioning of switch 20.

A locking button 21 is provided in order to lock the electronic console unit 12 against rotation about the vertical axis defined by post 8. The cables 22, 23 are releasably connected to the electronic units by means of plug and socket connections 24, 26 and 25, 27, respectively. The electronic measuring head unit 28 is releasably connected with the tilt axis of the transit by means of an adapter 29. Adapter 29 permits removal of the measuring head 28 from the transit unit 31, transit unit 31 being swingable about tilt axis 30. The electronic unit 12 further has a connecting socket 141 for connection to a power supply cable; the socket 141 is so located as to be in non-interfering position with the cable 23, and plug-socket connections 25, 27 (or cable 22 and sockets 24, 26) so that rotation of the electronic unit 12 about the axis of post 8, and rotation of the transit unit 31 with electronic measuring head 28 thereon does not meet any resistance of interference. Socket 141, or a similar socket can also be used to attach cables thereto which can be connected to an additional control panel similar to front panel 13, and including, preferably, at least the switch, or button array of buttons 18, 19, switch 20, and such other components as are desired. Such additional, parallel (or exclusive) connections are particularly suitable since data to be entered into the computer can be controlled and entered by an assistant to the surveyor operator of the transit and electronic measuring apparatus, for example standing alongside the surveyor, operating the electronics, and obtaining the computed read-out information.

The transit portion 31 is so constructed that its lower part has a seat element 32, to be inserted in the upper part, or socket end 9 of the support post 8, to be accurately centered and retained therein, as schematically indicated. Insertion of the seat element 32 in the centering socket 9 then provides for secure seating and alignment of the transit head 31 about the vertical axis of post 8. The tilt axis 30 of the transit has a telescope unit 33 with an ocular 34. An ocular 35 of a scale reading microscope is arranged adjacent ocular 34, and located together with the telescope 33 on the tilt axis 30. The electronic measuring head unit 28, as best seen in FIG. 2, includes a transmitting objective 36, a receiving objective 37, and a housing 38. A luminescent diode, or other signal-controllable radiation emissive element is provided to radiate intensity or amplitude modulated radiation, preferably infrared radiation; a photo diode, or other photo-sensitive element is provided in the receiver to receive and demodulate the radiation reflected back from a reflector located at the other terminal end of the measuring path. Electronic elements such as oscillators, amplifiers and mixers, not taking up much weight or space are located within housing 38. The electro-optical distance measuring system itself need not be described in detail since it is known and does not form subject matter of this present invention. Buttons or levers 39, 40 secured to the housing 38 removably lock the distance measuring head 28 to the tilt axis 30 of the transit 31. The transit 31 includes an optical plumb system assembled to the sight rule, or alidade thereof, which has an ocular 41 through which the base marker can be observed, and about which the tripod 1 is symmetrically located in centered position.

The transit 31, with the electronic measuring head 28 thereon may be interlocked for conjoint movement, for example by providing interengaging motion transmitting interlock means.

The electronic console unit 12 includes electronic circuits on printed circuit boards or other substrates 42 to determine and measure phase differences, and to compute and then indicate distance and elevation differences between the reflector and the transmitter, and further includes the power supplies for the computer portions as well as for the transmitter and receiver. The electronic circuits are preferably placed on replaceable printed circuit boards or substrates 42, so that technical advances can be incorporating in existing apparatus, by replacing selected circuit boards, as schematically shown in FIG. 2. The electronic unit 12 is held on the post 8 by means of a slide bearing 43, the post 8 being formed with an axial bore 44 to permit optical observation of the base marker, that is, to provide an optical path for the plumb determination.

The present invention may be used with various types of electronic surveying instruments and is not limited to the example illustrated in FIGS. 1 and 2. For example, the distance measuring head 28 may utilize a coaxial optic for the transmitting light beam as well as for the received light beam. Optical energy can be transmitted over the cables 22, 23 from the electronic unit 12, if the cables are formed as light guides, rather than including light beam generation in the housing 38. If microwaves are intended to be used, then the distance measuring head 28 would be supplied with appropriate antennae, for transmission or reception, or both. The distance measuring head 28 may also be arranged on a tilt axis which is separate and different from tilt axis 30 of the transit telescope, and separately supported on the support structure for the transit system 31. It is also possible to completely integrate the functional elements of the distance measuring head 28 and the transit telescope unit 31. Angular determination can be made with a known electronic tacheomater electronically, by decoding angular differences. The electronic signals, which store the information relative to the direction of the transit telescope are then conducted by means of the cables to the electronic unit 12, which can rotate with the transit, for recording and data processing and computation, together with measured distances.

The various components of the tacheometer are arranged in modular form, so that functionally separate units within the electronic unit 12 can be separately placed therein, or replaced, or separately packaged. For example, the functionally separate distance measuring computation section, a recording or storage section, and supply batteries, and the like, power converters, etc., can be separately placed in separate units or compartments within electronic unit 12, or in similar units, interconnected by cables and each separately rotatable and secured on post 8, or on separate post sections. All the elements are rotatable about the common post to be separately selectively used, or all used together, when assembled on the common support, concentrically with base 1.

Various changes and modifications may be made within the scope of the inventive concept.

The tacheometer in accordance with the present invention thus provides apparatus in which the measuring head and the electronics move together, so that the cables, light guides or other connections between the electronic unit and the transit unit always have essentially the same position. The cables are so arranged that they do not interfere with access to the operating elements, so that the accuracy of measurement by the transit, due to drag by the cables, is not impaired. The components of the electronic tacheometer are structurally separated from the transit elements themselves, so that the bearings for the transit head are not significantly loaded in excess of the load applied by usual transit structures. It is thus not necessary to provide for special, complicated or expensive constructions of the support system and the rotating base for the transit unit. The operating and indicating elements are located on the electronic unit at fixed positions with respect to the observer, beneath the operating and reading unit of the transit itself, which provides for simplified reading, insertion of data, and operation, to thus accelerate measurements.

The structure in accordance with the invention permits separate placement of the various components and assembly, one after the other, over a centering arrangement or tripod arrangement which is already aligned with a fixed datum marker, such as a geodesic marker. The total weight of the apparatus is thus divided into components, each of which are lighter than the aggregate, so that placement without disturbing the exact position and center of the apparatus is facilitated. Upon assembly, in the field, any danger of loss of centering over a survey marker is avoided. Thus, the base can be first placed; thereafter, the support post together with the electronic unit is placed thereon in exactly centered position, and the transit is then inserted thereover. The centering can be checked by the optical path provided by the bores through the post.

I claim:

1. In a tacheometer structure assembly having
   a transit unit (31, 33, 34) for optical measurement of surveying angles, and movably mounted for rotation, and tilt about respective perpendicular measurement axes,
   an electronic measuring head unit (28) secured to and rotatable with said transit unit to obtain signals representative of distance of a target from said structure;
   an electronic console unit (12) including circuit components to evaluate the signals and to compute and display distance information;
   and a base support unit (1) adapted to be positioned with respect to a reference marker;
   the improvement comprising a support shaft (8) having a central axis connectable to said base support unit (1) at one end and connectable to said transit unit (31, 33, 34) at the other end;
   means (9, 32) centering said transit unit on said central axis;
   said electronic console unit being rotatably secured to and surrounding said support shaft (8), located intermediate of the base support unit (1) and the transit unit (31, 33, 34) and rotatable about said central axis,
   and signal transmission means (22, 23) interconnecting the radiation head unit (28) and the electronic console unit.

2. Tacheometer assembly according to claim 1, wherein the central axis extends vertically from the base support unit (1);
   and the centering means (9, 32) releasably secure the transit unit (31, 33, 34) to the support shaft (8) such that, when connected, it is centered on said base support unit (1).

3. Tacheometer assembly according to claim 1, wherein the base support unit (1) comprises a centering means (5);
   and the support shaft (8) comprises matching centering means (7) engageable in the centering means (5) of the base support unit (1).

4. Tacheometer assembly according to claim 1, wherein the end of the lower end of the support shaft (8) is formed with an engagement and centering socket (7); and the base support unit (1) is mountable on a tripod.

5. Tacheometer assembly according to claim 1, wherein the signal transmission means comprises flexible cables (22, 23) to conduct electric or optic signals between the radiation head unit (28) and the electronic console unit (12).

6. Tacheometer assembly according to claim 1, wherein the support shaft (8) is formed with a central bore (44) colinear with said axis to provide an optical path between the transit unit (31, 33, 34) and the base support unit (1).

7. Tacheometer assembly according to claim 1, wherein the electronic console unit (12) is rotatable about said shaft (8);

and locking means (21) are provided to secure the electronic console unit (12) on the shaft (8) in a selected angular position.

8. Tacheometer assembly according to claim 1, wherein the transit unit (31, 33, 34) is rotatable about said central axis;

and said electronic console unit (12) and the transit unit (31, 33, 34) are interconnectable for conjoint rotary movement.

9. Tacheometer assembly according to claim 8, wherein the upper portion of the electronic console unit (12) and the upper portion or alidade, of the transit unit (31, 33, 34) are formed with interengaging motion transmitting interlock means.

10. Tacheometer assembly according to claim 1, further comprising a carrying handle (11) secured to said electronic console unit (12).

11. Tacheometer assembly according to claim 1, wherein the electronic console unit (12) comprises and an assembly of modular, functionally separate and separately removable electrically connected subassemblies (42), which are also mechanically connected together for joint rotation about said axis.

12. Tacheometer assembly according to claim 1, wherein the electronic console unit (12) comprises electronic computer circuit means (42) and manual data insertion means (18).

13. Tacheometer assembly according to claim 1, wherein the electronic console unit (12) includes a central bearing (43) journalling the console unit on the central shaft (8) colinear with said axis, said shaft being formed with upper (9) and lower (7) centering and attachment means;

said electronic console unit (12), journalled on the shaft, the shaft (8), and said centering and attachment means (7, 9) forming a subassembly;

said electronic console unit being rotatable by means of said bearing about said shaft to permit rotation of said electronic unit about said axis upon swinging movement of the transit unit and the electronic measuring head thereon about said axis.

14. Tacheometer assembly according to claim 13, wherein said shaft (8) is hollow, and an optical path (44) is formed through said subassembly to permit optical observation of a ground reference marker from said transit unit (31, 33, 34) along said central axis.

* * * * *